United States Patent

Young et al.

[11] Patent Number: 5,929,935
[45] Date of Patent: Jul. 27, 1999

[54] METHOD FOR REDUCING FLICKER AND CIRCUIT THEREFOR

[75] Inventors: James W. Young; Donald J. Voss, both of Phoenix, Ariz.

[73] Assignee: Motorola, Inc., Schaumburg, Ill.

[21] Appl. No.: 08/753,813

[22] Filed: Dec. 2, 1996

[51] Int. Cl.[6] .................................................. H04N 5/21
[52] U.S. Cl. ........................................ 348/607; 348/910
[58] Field of Search ................................... ; 348/910, 441, 348/443, 446, 447, 448, 458, 607; H04N 7/01, 5/21, 5/213

[56] References Cited

U.S. PATENT DOCUMENTS

| | | | |
|---|---|---|---|
| 4,768,092 | 8/1988 | Ishikawa | 348/458 |
| 4,799,105 | 1/1989 | Mitchell et al. | 356/160 |
| 5,136,385 | 8/1992 | Campbell | 348/910 |
| 5,146,329 | 9/1992 | Flamm | 348/910 |
| 5,285,277 | 2/1994 | Min | 348/607 |

*Primary Examiner*—David E. Harvey
*Attorney, Agent, or Firm*—Rennie William Dover; Robert D. Atkins

[57] ABSTRACT

A method and circuit (20) for reducing flicker. Pixel values ($Y_0$, $Y_1$, $Y_{-1}$) are transmitted to input terminals (23, 21, 22) of the circuit (20). A first difference magnitude is calculated by subtracting the pixel value ($Y_0$) of a middle pixel from the pixel value ($Y_{-1}$) of an upper pixel and taking an absolute value of the result. A second pixel magnitude is calculated by subtracting the pixel value ($Y_0$) of the middle pixel from the pixel value of a lower pixel and taking an absolute value of the result. A larger of the first and second pixel magnitudes is compared to a user-selected threshold value. The pixel value ($Y_0$) of the middle pixel is either changed or left unchanged in accordance with the results of the comparison.

14 Claims, 2 Drawing Sheets

10

15

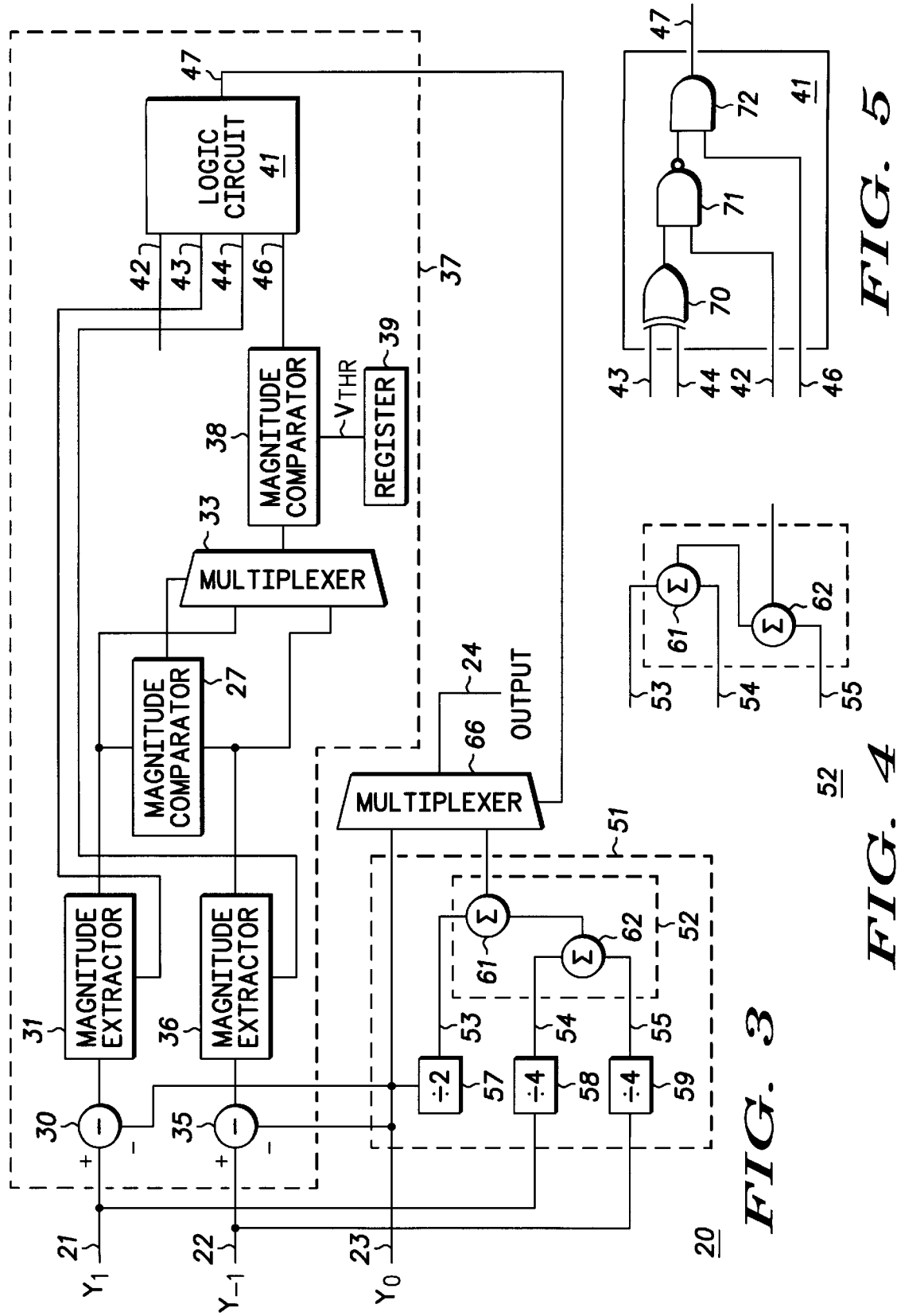

5,929,935

METHOD FOR REDUCING FLICKER AND CIRCUIT THEREFOR

BACKGROUND OF THE INVENTION

The present invention relates, in general, to image processing and, more particularly, to interlaced video signals.

In the broadcast television industry, video signals are transmitted from a transmitter to a receiver as interlaced video signals. Typically, the receiver is a television set or television monitor. In the television set, a picture tube generates light by sending a beam of electrons to a phosphor coated screen or face. The phosphors emit visible light when hit by the electrons. The intensity of the light does not remain constant but decays with time. The amount of time that the light remains visible is called persistence. Typically, designers design the picture tubes such that the light decays at a rate that allows movement on a television screen without leaving artifacts behind, e.g., if the persistence is too long, movement will smear the image. Thus, the designer tailors the decay of the light, i.e., the properties of the phosphors, as a compromise between flicker and the smearing of movement.

Interlaced video signals make use of two sweeps of the picture tube to present a single image. Each sweep is called a field and two fields together comprise a frame. Each field starts at the top left of the screen and every other horizontal line is drawn from left to right moving down the screen. Thus the lines above and below every line in a frame come from an opposite field. Fields are also referred to as being even and odd or first and second. Although this technique halves the required bandwidth, it results in flicker.

More particularly, flicker occurs if a single horizontal line in one field has a brightness significantly more intense than the lines that are above and below it in the opposing field. The flicker results from the bright line decaying without its brightness being replaced by the lines from the opposing field. Because the light decays at approximately one-thirtieth of a second, it is perceptible to the human eye. This is irritating to the person watching the television screen.

Hence, a need exists for a method and an apparatus to reduce flicker. It would be advantageous for this method and apparatus to be low cost and easy to implement.

BRIEF DESCRIPTION OF THE DRAWINGS

FIG. 3 is a schematic diagram of a flicker reduction circuit in accordance with the present invention;

FIG. 4 is a schematic diagram of a second embodiment for a summation circuit of FIG. 3;

FIG. 5 is a schematic diagram of a portion of the flicker reduction circuit of FIG. 3.

DETAILED DESCRIPTION OF THE DRAWINGS

Generally, the present invention provides a method and a circuit for reducing flicker in an interlaced video signal without reducing the vertical resolution of the video signal. In accordance with one aspect of the present invention, flicker is reduced by filtering the video signal when the magnitude of the intensity between two vertically adjacent pixels is greater than a user-defined threshold value. In another aspect of the present invention, a circuit is provided for reducing flicker.

Figure 1:
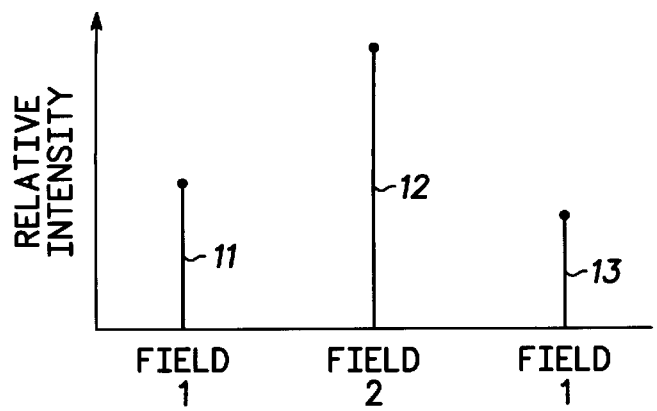
FIG. 1 is plot of relative intensities for three vertically aligned pixels in a pair of opposing fields whose flicker will be reduced in accordance with the present invention.

FIG. 1 is a plot 10 of relative intensity or brightness for three vertically aligned pixels in a pair of opposing fields (FIELDS 1 and 2) whose flicker will be reduced in accordance with a first example of the present invention. More particularly, FIG. 1 shows pixels 11, 12, and 13, wherein the intensity or pixel value of pixel 12 is higher than those of pixels 11 and 13. Pixels 11 and 13 are in the same field (FIELD 1) whereas pixel 12 is in a different field (FIELD 2). It should be understood that pixel 12 is the pixel to be displayed and is between and vertically adjacent to pixels 11 and 13 on a face of a cathode ray tube, a picture tube, a screen, or the like. In other words, pixels 11, 12, and 13 are in the same column of an array of pixels. In the first example, flicker occurs because the intensity of pixel 12 is higher than the intensities of pixels 11 and 13.

In a second example (not shown) of the present invention, flicker occurs because the intensity of pixel 12 is lower than the intensities of pixels 11 and 13. For the first and second examples, the intensity of the pixel to be displayed is either higher or lower than the intensities of the adjacent pixels.

Figure 2:
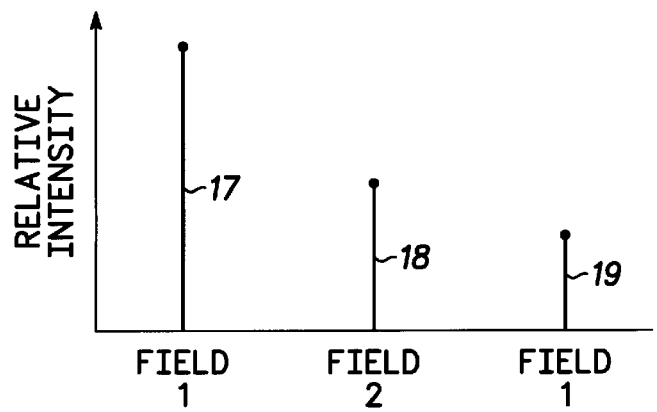
FIG. 2 is another plot of relative intensity for three vertically aligned pixels in a pair of opposing fields whose flicker will be reduced in accordance with the present invention.

FIG. 2 is a plot 15 of relative intensity or brightness for three vertically aligned pixels in a pair of opposing fields (FIELDS 1 and 2) whose flicker will be changed in accordance with a third example of the present invention. More particularly, FIG. 2 shows pixels 17, 18, and 19, wherein the intensity of pixel 18 is less than the intensity of pixel 17 and the intensity of pixel 19 is less than the intensity of pixel 18. Pixels 17 and 19 are in the same field (FIELD 1) whereas pixel 18 is in a different field (FIELD 2). It should be understood that pixel 18 is between and vertically adjacent to pixels 17 and 19 on a face of a cathode ray tube, a picture tube, a screen, or the like. In other words, pixels 17, 18, and 19 are the same column of an array of pixels. In the third example, flicker occurs because the intensity of pixel 18 is lower than the intensity of pixel 17 and the intensity of pixel 19 is less than the intensity of pixel 18.

In a fourth example (not shown) of the present invention, flicker occurs because the intensity of pixel 18 is higher than the intensity of pixel 17 and the intensity of pixel 19 is higher than the intensity of pixel 18. For the third and fourth examples, the intensity of the pixel to be displayed is between the intensities of the adjacent pixels.

In accordance with the present invention, a picture has an unacceptable amount of flicker when the difference in intensity between pixels 11 and 12 (or between pixels 12 and 13) is greater than a user-selected threshold value, $V_{THR}$. In other words, when the difference in intensity between two vertically adjacent pixel values is greater than $V_{THR}$, flicker is considered to be unacceptable. By way of example, $V_{THR}$ is a flicker intensity limit and is the value stored in a user-writeable register. Flicker is reduced by adjusting the intensity of pixel 12, e.g., lowering the intensity of pixel 12 for the first example. Similarly, the picture has an unacceptable amount of flicker when the difference in intensity between pixels 17 and 18 (or between pixels 18 and 19) is greater than the user-selected threshold value, $V_{THR}$. Flicker is reduced by adjusting the intensity of pixel 18.

FIG. 3 is a schematic diagram of a flicker reduction circuit 20 in accordance with the present invention. Flicker reduction circuit 20 is also referred to as a flicker reduction filter circuit. Flicker reduction circuit 20 has a plurality of input terminals 21, 22, and 23, and an output terminal 24. More particularly, flicker reduction circuit 20 is comprised of a magnitude selector circuit 37, a vertical averaging circuit 51, and a multiplexer 66.

Magnitude selector circuit 37 has subtractor circuits 30 and 35, magnitude extractors 31 and 36, magnitude comparator circuits 27 and 38, a multiplexer 33, a register 39, and a logic circuit 41. Subtractor circuit 30 has an input coupled to receive a first input signal of a positive polarity via input terminal 21 and an input coupled to receive an input signal of a positive polarity via negative input terminal 23. Subtractor circuit 30 performs a two's complement operation on the value of the input signal received at negative input terminal 23. An output of subtractor circuit 30 is connected to an input of a magnitude extractor circuit 31. An output of magnitude extractor circuit 31 is coupled to a first input of a magnitude comparator 27 and to a first input of a multiplexer circuit 33.

Magnitude selector circuit 37 further includes a second subtractor circuit 35 having an input connected to receive a second input signal of a positive polarity via negative input terminal 23 and an input coupled to receive the input signal of a positive polarity via input terminal 22. Subtractor circuit 35 performs a two's complement operation on the value of the input signal received at negative input terminal 23. An output of subtractor circuit 35 is connected to an input of a magnitude extractor circuit 36. An output of magnitude extractor circuit 36 is coupled to a second input of magnitude comparator 27 and to a second input of multiplexer circuit 33.

An output of multiplexer circuit 33 is connected to a first input of a magnitude comparator circuit 38. Magnitude comparator circuit 38 has a second input coupled for receiving a user-selected threshold value, $V_{THR}$. By way of example, the value $V_{THR}$ can be supplied from register 39 as a user-writeable value or as a hardwired value. An output of magnitude comparator circuit 38 is connected to a logic circuit 41.

Logic circuit 41 has a plurality of input terminals 42, 43, 44, and 46, and an output terminal 47. Input terminal 43 is connected to an output of magnitude extractor circuit 31, and input terminal 44 is connected to the output of magnitude extractor 36. Input terminal 46 is connected to the output of magnitude comparator circuit 38. Output terminal 47 of logic circuit 41 is connected to the selector terminal of multiplexer 66. An output terminal of multiplexer 66 serves as output terminal 24 of flicker reduction filter 20.

Briefly referring to FIG. 5, a circuit schematic of an embodiment of logic circuit 41 is shown. In accordance with this embodiment, logic circuit 41 includes an EXCLUSIVE-OR gate 70 having a pair of inputs wherein one input serves as input terminal 43 and the other input serves as input terminal 44 of logic circuit 41. An output of EXCLUSIVE-OR gate 70 is connected to a first input of a NAND gate 71. The second input of NAND gate 71 serves as input terminal 42 of logic circuit 41. Input terminal 42 will be further described with reference to FIG. 5. An output of NAND gate 71 is connected to an input of an AND gate 72. A second input of AND gate 72 serves as input terminal 46 and an output of AND gate 72 serves as output terminal 47 of logic circuit 41.

It should be understood that logic circuit 41 is an optional element and that when logic circuit 41 is not present, the output of magnitude comparator circuit 38 is connected to the selector terminal of multiplexer 66.

Referring again to FIG. 3, flicker reduction circuit 20 further includes a vertical averaging circuit 51 having, for example, inputs coupled for receiving pixel values $Y_0$, $Y_1$, and $Y_{31\ 1}$ via respective input terminals 23, 21, and 22. Vertical averaging circuit 51 is also referred to as an adder circuit. More particularly, vertical averaging circuit 51 is comprised of divider circuits 57, 58, and 59, and a summation circuit 52. In one embodiment summing circuit 61 and summing circuit 62 cooperate to form summation circuit 52. Divider circuit 57 has an input connected to input terminal 23 and an output 53 connected to an input of summation circuit 52. Divider circuit 58 has an input connected to input terminal 21 and an output 54 connected to an input of summation circuit 52. Divider circuit 59 has an input connected to input terminal 22 and an output 55 connected to an input of summation circuit 52. In this embodiment, output 53 of divider circuit 57 is connected to an input of summing circuit 61. Output 54 of divider circuit 58 is connected to an input of a summing circuit 62. Output 55 of divider circuit 59 is connected to a second input of summing circuit 62. An output of summing circuit 62 is connected to a second input of summing circuit 61. An output of summing circuit 61 serves as the output of vertical averaging circuit 51 and is connected to a first input of a multiplexer circuit 66.

FIG. 4 shows another embodiment of summation circuit 52. In this second embodiment, output 53 of divider circuit 57 is connected to an input of a summing circuit 61. Output 54 of divider circuit 58 is connected to an input of a summing circuit 61. Output 55 of divider circuit 59 is connected to a first input of summing circuit 62. An output of summing circuit 61 is connected to a second input of summing circuit 62. An output of summing circuit 62 serves as the output of vertical averaging circuit 51 and is connected to a first input of a multiplexer circuit 66.

A second input of multiplexer circuit 66 is connected to an input terminal 23 of vertical averaging circuit 51. By way of example, divider circuit 57 is a divide by two circuit, divider circuit 58 is a divide by four circuit, and divider circuit 59 is a divide by four circuit. It should be understood that the divider value of divider circuits 57, 58 and 59 is not a limitation of the present invention. Further, divider circuits 57, 58, and 59 may be implemented using a shift register where a shift-right functions as a divide by two circuit and a double shift-right functions as a divide by four circuit, a multiplier circuit, or the like.

Figure 6:
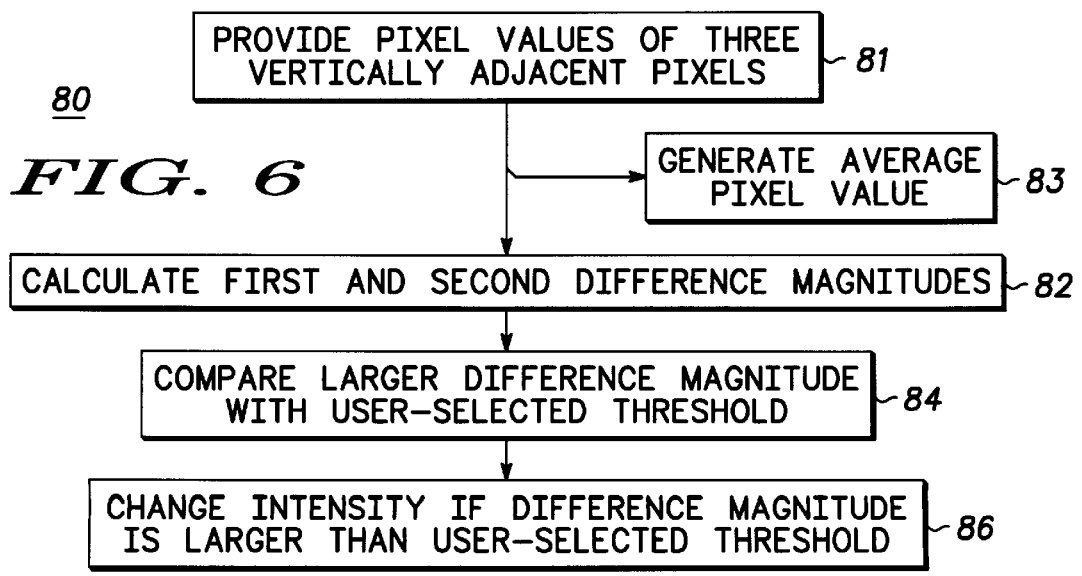
FIG. 6 is a flow diagram illustrating a method for reducing flicker in accordance with the present invention.

In operation, flicker reduction circuit 20 is used to reduce the flicker of an interlaced video signal without reducing the entire vertical resolution of the video signal. FIG. 6 is a flow diagram 80 of a method for reducing flicker in an interlaced video signal. Preferably, the method is accomplished using flicker reduction circuit 20. In a first step (represented by reference number 81) pixel values of three vertically adjacent pixels are provided, wherein the pixels are positioned such that the first pixel is an upper pixel, the second pixel is a middle pixel, and the third pixel is a lower pixel. It should be understood that the middle pixel is also referred to as the pixel to be displayed.

In a second step (represented by reference number 82), first and second difference magnitudes are calculated. The first difference magnitude is calculated by subtracting the pixel value of the middle pixel from the pixel value of the upper pixel and taking the absolute value of the result. The second pixel magnitude is calculated by subtracting the pixel value of the middle pixel from the pixel value of the lower pixel and taking the absolute value of the result. In addition to generating the first and second pixel magnitudes, the signs of the differences are also stored for future reference.

In parallel with the second step, the pixel values are conditioned by generating an average pixel value for the middle pixel (represented by reference number 83). In other words, the intensity of the middle pixel is raised or lowered, in accordance with an averaging circuit such as vertical averaging circuit 51 of FIG. 3. The average pixel value is stored.

In a third step (represented by reference number 84), the larger of the first and second pixel magnitudes is compared to a user-selected threshold value.

In a fourth step (represented by reference number 86), the intensity of the middle pixel is either changed or left unchanged in accordance with the results of the comparison of the third step (represented by reference number 84).

Simultaneously referring to FIGS. 1, 3, and 4, the operation of the present invention will now be described. It should be noted that $Y_0$, $Y_{-1}$, and $Y_1$ are signals representing the intensity or the pixel values of pixels 12, 11, and 13, respectively, of FIG. 1. $Y_{31\ 1}$ represents the intensity of pixel 11 which is vertically above pixel 12 and $Y_1$ represents the intensity of pixel 13 which is vertically below pixel 12. $Y_0$ represents the intensity of the pixel to be displayed and is a pixel value input at terminal 23 (FIG. 3) and transmitted to summing circuits 30 and 35, divider circuit 57 of vertical averaging circuit 51, and multiplexer circuit 66. Pixel value $Y_{-1}$ is a pixel value input at terminal 22 and transmitted to subtractor circuit 35 and divider circuit 59 of vertical averaging circuit 51. Pixel value $Y_1$ is a pixel value input at terminal 21 and transmitted to subtractor circuit 30 and divider circuit 58 of vertical averaging circuit 51.

Vertical averaging circuit 51 divides pixel value $Y_0$ by N, pixel value $Y_1$ by X, and pixel value $Y_{-1}$ by Z, where N, X, and Z are variables representing integers. By way of example, N has a value of 2 and X and Z have a value of 4. The results are summed to obtain a weighted average. The weighted average is transmitted to the second input of multiplexer circuit 66.

Subtractor circuit 30 takes the difference between intensity $Y_0$ and intensity $Y_1$ (i.e., $Y_1-Y_0$) and transmits the difference to magnitude extractor 31. It should be noted that subtractor circuit 30 cooperates with magnitude extractor 31 to generate a magnitude $|Y_1-Y_0|$ of the difference between intensities $Y_0$ and $Y_1$. Magnitude extractor 31 transmits the magnitude of the difference $|Y_1-Y_0|$, i.e., the absolute value of the difference in intensities between $Y_0$ and $Y_1$, to the first input of comparator 27 and to the first input of multiplexer 33.

Likewise, subtractor circuit 35 takes the difference between the intensity $Y_0$ and the intensity $Y_{-1}$ (i.e., $Y_{-1}-Y_0$) and transmits the difference to magnitude extractor 36. It should be noted that subtractor circuit 35 cooperates with magnitude extractor 36 to generate a magnitude $|Y_{31\ 1}-Y_0|$ of the difference between intensities $Y_0$ and $Y_{-1}$. Magnitude extractor 36 transmits the magnitude of the difference $|Y_{31\ 1}-Y_0|$, i.e., the absolute value of the difference in intensities between intensities $Y_0$ and $Y_{-1}$, to the second input of magnitude comparator circuit 27 and to the second input of multiplexer 33.

In addition, magnitude extractor circuit 31 outputs a first polarity signal that indicates whether intensity $Y_1$ is greater than intensity $Y_0$. The first polarity signal is transmitted to input terminal 43 of logic circuit 41. Similarly, magnitude extractor circuit 36 outputs a second polarity signal that indicates whether intensity $Y_{-1}$ is greater than intensity $Y_0$. The second polarity signal is transmitted to input terminal 44 of logic circuit 41.

Magnitude comparator circuit 27 compares the magnitude of the difference between intensities $Y_0$ and $Y_1$ with the magnitude of the difference between intensities $Y_0$ and $Y_{-1}$ and transmits a selector signal to multiplexer circuit 33. The selector signal is designed to select the input to multiplexer circuit 33 that receives the larger magnitude signal. Multiplexer circuit 33 then transmits this larger magnitude signal to magnitude comparator circuit 38. Magnitude comparator circuit 38 compares the magnitude signal with a user-selected threshold, $V_{THR}$, and outputs a signal indicating whether the magnitude difference is larger than the user-selected threshold, $V_{THR}$.

If the magnitude difference is greater than the user-selected threshold, $V_{THR}$, a logic high voltage level is transmitted to input terminal 46 of logic circuit 41. If the magnitude difference is less than the user-selected threshold, $V_{THR}$, a logic low voltage level is transmitted to input terminal 46 of logic circuit 41.

Logic circuit 41 further includes an input terminal 42 which is coupled to receive a configuration signal. By way of example, the configuration signal indicates whether filtering is to be performed for the cases illustrated in FIGS. 1 and 2 or whether filtering for additional cases is to be performed. An additional case would include relative increasing or decreasing intensity for three vertically aligned pixels in a pair of opposing fields (FIELDS 1 and 2). By way of example, the configuration signal is a logic signal provided by the end user, wherein a logic low signal indicates filtering for the cases of FIGS. 1 and 2 and a logic high signal indicates filtering for the additional cases.

Briefly referring to FIGS. 1 and 5, when upper and lower pixels 11 and 13 have a lower intensity than middle pixel 12, i.e., the pixel to be displayed, the logic levels at input terminals 43 and 44 of EXCLUSIVE-OR gate 70 are the same, resulting in EXCLUSIVE-OR gate 70 outputting a logic low voltage level. The logic low voltage level is transmitted to NAND gate 71 which in turn transmits a logic high voltage level to the input of AND gate 72. If the output signal of magnitude comparator circuit 38 is high (indicating an unacceptable level of flicker), a logic high signal is transmitted to input terminal 46 of logic circuit 41. If the output signal of magnitude comparator circuit 38 is low (indicating an acceptable level of flicker), a logic low signal is transmitted to input terminal 46 of logic circuit 41.

Referring again to FIGS. 3 and 5, when a logic low signal is transmitted from output terminal 47 to the selector input of multiplexer 66, intensity or pixel value $Y_0$ is transmitted to output terminal 24. When a logic high signal is transmitted from output terminal 47 to the selector input of multiplexer 66, a weighted average intensity or flicker reduction pixel value is transmitted to output terminal 24 of flicker reduction circuit 20. In other words, the weighted average of intensities $Y_0$, $Y_1$, and $Y_{-1}$ is transmitted to output terminal 24. Thus, the intensity of the pixel is adjusted.

By now it should be appreciated that a method and a circuit have been provided for reducing flicker in an interlaced video signal or image. The flicker reduction technique in accordance with the present invention spreads the energy of the pixel rather than just reducing the brightness. Flicker reduction performed in accordance with the present invention allows darkening a single bright line as well as brightening a single dark line. The present invention further allows smoothing of the intensities in brightness of an interlaced video signal.

We claim:

1. A method for reducing flicker, comprising the steps of:
   generating a first absolute value for a first difference signal between a pixel value of a middle pixel and a pixel value of an upper pixel;
   generating a second absolute value for a second difference signal between the middle pixel and a pixel value of a lower pixel;
   determining polarity signals for the first and second difference signals, wherein the polarity signals are dependent upon an intensity of the middle pixel compared to the upper and lower pixels;
   comparing the first absolute value or the second absolute value to a user-selected threshold value; and
   replacing the pixel value of the middle pixel in accordance with the step of comparing the first absolute value and the second absolute value to the user-selected threshold value and the polarity signals of the first and second difference signals, wherein the pixel value of the middle pixel is replaced by a weighted value of the intensities of the upper, middle, and lower pixels.

2. The method of claim 1, wherein the step of calculating a first absolute value further includes a step of extracting a sign for the first difference.

3. The method of claim 1, further including a step of subtracting the lower pixel value from the pixel value of the middle pixel.

4. The method of claim 3, wherein the step of calculating a second absolute value further includes a step of extracting a sign for the second difference.

5. The method of claim 4, further including comparing the sign of the first difference with the sign of the second difference and adjusting the pixel value of a middle pixel when the sign of the first difference matches the sign of the second difference and the user-selected threshold value is exceeded.

6. A flicker reduction circuit, comprising:
   a first subtractor having first and second inputs and an output;
   a second subtractor having first and second inputs and an output, wherein the first input is coupled to the first input of the first subtractor;
   first and second magnitude extractors, each magnitude extractor having an input and an output, the input of the first magnitude extractor coupled to the output of the first subtractor, and the input of the second magnitude extractor coupled to the output of the second subtractor;
   a first magnitude comparator having first and second inputs and an output, wherein the first input is coupled to the output of the first magnitude extractor and the second input is coupled to the output of the second magnitude extractor;
   a first multiplexer having first and second data inputs, a selector input, and an output, wherein the first data input is coupled to the output of the first magnitude extractor, the second data input is coupled to the output of the second magnitude extractor, and the selector input is coupled to the output of the first magnitude comparator;
   a second magnitude comparator having first and second inputs and an output, wherein the first input is coupled to the output of the first multiplexer;
   a first divider having first and second inputs and an output, wherein the first input of the first divider is coupled to the first input of the first subtractor;
   a second divider having first and second inputs and an output, wherein the first input is coupled to the second input of the first subtractor;
   a third divider having first and second inputs and an output, wherein the first input is coupled to the second input of the second subtractor;
   an adder circuit having first, second, and third inputs and an output, wherein the first input is coupled to the output of the first divider, the second input is coupled to the output of the second divider, and the third input is coupled to the output of the third divider; and
   a second multiplexer having first and second data inputs, a selector input, and an output, wherein the first data input is coupled to the first input of the first subtractor, and the second data input is coupled to the output of the adder circuit.

7. The flicker reduction circuit of claim 6, wherein the adder circuit comprises:
   a first adder having first and second inputs and an output, wherein the first input serves as the second input of the adder circuit and the second input serves as the third input of the adder circuit; and
   a second adder having first and second inputs and an output, wherein the first input serves as the first input of the adder circuit and the second input is coupled to the output of the first adder, and the output of the second adder is coupled to the output of the adder circuit.

8. The flicker reduction circuit of claim 6, wherein the adder circuit comprises:
   a first adder having first and second inputs and an output, wherein the first input serves as the first input of the adder circuit and the second input serves as the second input of the adder circuit; and
   a second adder having first and second inputs and an output, wherein the first input serves as the third input of the adder circuit and the second input is coupled to the output of the first adder, and the output of the second adder is coupled to the output of the adder circuit.

9. The flicker reduction circuit of claim 6, wherein the first magnitude extractor further includes a sign extractor output and the second magnitude extractor further includes a sign extractor output.

10. The flicker reduction circuit of claim 9, further comprising a logic circuit having first, second, third, and fourth inputs and an output, wherein the first input is coupled to the sign extractor output of the first magnitude extractor, the second input is coupled to the sign extractor output of the second magnitude extractor, the third input is coupled to receive a configuration signal, and the fourth input is coupled to the output of the second magnitude comparator, and the output of the logic circuit is coupled to the selector input of the second multiplexer.

11. The flicker reduction circuit of claim 10, wherein the logic circuit further comprises:
   an EXCLUSIVE-OR gate having first and second inputs and an output, wherein the first input serves as the first input of the logic circuit and the second input serves as the second input of the logic circuit;

a NAND gate having first and second inputs and an output, wherein the first input is coupled to the output of the EXCLUSIVE-OR gate and the second input serves as the third input of the logic circuit; and an AND gate having first and second inputs and an output, wherein the first input is coupled to the output of the NAND gate, the second input serves as the fourth input of the logic circuit, and the output serves as the output of the logic circuit.

12. The flicker reduction circuit of claim 11, further comprising a user-writeable register having an input and an output, the output coupled to the second input of the second magnitude comparator.

13. The flicker reduction circuit of claim 6, wherein the first divider is a single shift-right register.

14. The flicker reduction circuit of claim 6, wherein the second and third dividers are double shift-right registers.

* * * * *